United States Patent [19]
Kennedy

[11] Patent Number: 5,855,265
[45] Date of Patent: Jan. 5, 1999

[54] LOW DISENGAGE SPEED FAN CLUTCH

[75] Inventor: Lawrence Craig Kennedy, Kettering, Ohio

[73] Assignee: General Motors Corporation, Detroit, Mich.

[21] Appl. No.: 882,475

[22] Filed: Jun. 25, 1997

[51] Int. Cl.[6] .................................................. A16D 35/02
[52] U.S. Cl. .................................... 192/58.7; 192/58.682
[58] Field of Search ............................. 192/58.7, 58.682, 192/58.5, 58.6, 58.68

[56] References Cited

U.S. PATENT DOCUMENTS

| | | |
|---|---|---|
| 3,587,801 | 6/1971 | Riner ................................... 192/58.682 |
| 3,949,849 | 4/1976 | Hammer . |
| 3,983,981 | 10/1976 | Snodgrass et al. . |
| 3,990,556 | 11/1976 | Hayashi et al. ......................... 192/58.7 |
| 4,116,317 | 9/1978 | Streeter .............................. 192/58.7 X |
| 4,132,299 | 1/1979 | Rohrer et al. ....................... 192/58.7 X |
| 4,235,322 | 11/1980 | Sutaruk . |
| 4,278,158 | 7/1981 | Martin . |
| 4,381,051 | 4/1983 | Kikuchi . |
| 4,403,684 | 9/1983 | Haeck . |
| 4,467,901 | 8/1984 | Hattori et al. . |
| 4,633,988 | 1/1987 | Light ................................. 192/58.7 X |
| 4,699,258 | 10/1987 | Johnston et al. . |
| 4,741,421 | 5/1988 | Johnston . |
| 4,924,984 | 5/1990 | Kennedy . |
| 4,969,920 | 11/1990 | Kennedy . |
| 4,995,494 | 2/1991 | Kennedy et al. . |
| 5,113,987 | 5/1992 | Drennen et al. ........................ 192/58.7 |
| 5,119,921 | 6/1992 | Drennen et al. . |
| 5,377,798 | 1/1995 | Hudson et al. . |

FOREIGN PATENT DOCUMENTS 57-167533 A  10/1982  Japan .

Primary Examiner—Richard M. Lorence
Attorney, Agent, or Firm—Jeffrey A. Sedlar

[57] ABSTRACT

A clutch includes an input element with an engaged input shaft and clutch plate rotatable in concert. The clutch plate has an annular portion with a clutch plate set of lands and grooves mating with a housing set of lands and grooves to define a shear zone space. A cover is included as part of the housing and engages the body and includes a reservoir. A pump plate is captured between the cover and the body separating out a working chamber generally within the body and includes a pump port. The pump port includes an outer extreme edge that is substantially in line with the outer surface of the clutch plate. A valve port in the pump plate is positioned near the radial outside of the reservoir. A control arm normally closes the valve port and is movable to open the valve port. When the valve port is closed, fluid carried in the working chamber moves radially outward under centrifugal force and is forced through the pump port under operation of a wiper due to relative rotation between the clutch plate and the pump plate so that substantially all of the fluid is pumped out of the working chamber and a high slip speed is established between the housing and the clutch plate. A rotating peripheral accumulator is defined between the depleted surface of the clutch plate and the annular step of the body that accommodates fluid inertia and provides volumetric compensation for fluid pressurization and compression caused by an externally applied torque change.

8 Claims, 2 Drawing Sheets

LOW DISENGAGE SPEED FAN CLUTCH

TECHNICAL FIELD

The present invention relates to a low disengage speed fan clutch and more particularly, to a viscous fluid fan drive clutch operable in a varying externally applied torque load environment with an extremely low terminal disengage speed.

BACKGROUND OF THE INVENTION

Fan clutches operating on viscous fluid torque transfer principles conventionally consist of a driving clutch plate coaxially mounted on a drive shaft that is driven at engine speed or some selected proportion thereof. A driven clutch body having a central bearing is generally coaxially located on the same drive shaft as the clutch plate to rotate at some range of speeds, effecting slip-speeds between the clutch body and the clutch plate. Both the clutch plate and the clutch body display intermeshing lands and grooves that act to transfer forces as the drive surfaces of the clutch. The space between the grooves is filled with a viscous fluid such as silicone that transfers drive torque from the clutch plate to the clutch body. A pump plate typically separates the interior of the clutch body into two chambers including a working chamber containing the drive surfaces and a reservoir chamber. A combination of raised diverters formed into or fastened onto the pump plate, and holes in the plump plate itself, form a pumping mechanism that uses the relative motion of the face of the clutch plate to force fluid out of the working chamber containing the drive surfaces, and into the reservoir chamber. This action removes the viscous fluid from the space between the drive surfaces, thereby reducing the driving torque transfer effected in the clutch.

A temperature responsive actuator is generally located on the face of a cover that seals the clutch mechanism. When subjected to temperatures higher than a preselected calibration temperature of the clutch, the actuator opens a valve formed into the pump plate and permits the fluid contained in the reservoir chamber to flow back into the working chamber. Once in the working chamber, centrifugal force causes the fluid to flow into the space between the drive surfaces, thereby restoring drive torque. The clutch pump and valve are sized so that when the valve is open, it returns fluid to the working chamber faster than the pump can remove it to the reservoir chamber, so that substantially all of the fluid carried by the clutch remains in the working chamber when the clutch is engaged.

Terminal disengage speed refers to the clutch output speed effected by residual fluid after fluid pump-out from the working chamber. With a viscous fluid clutch, conventional knowledge requires a relatively high terminal disengage speed of approximately 1.2–1.4 times engine speed, at least partially based on the premise that fan speed should never be lower than engine speed at idle. Generally, a disengage speed is required that is sufficient to supply cooling air flow to meet desired engine cooling temperatures and air conditioning compressor pressures, without completely engaging the clutch under all typical operating conditions. The fan drive is used to maintain air flow, pulling air through the heat exchangers under all conditions, even when the clutch is disengaged.

To minimize fan drive power consumption, disengaged fan speed is preferably minimized. Some cooling systems, such as those that use a viscous clutch driven fan in series with an electrically driven fan that supplies all but the most severe cooling requirements, would permit reducing the disengage speed. However, with a conventional viscous fluid fan clutch, an over-reduction in disengage speed results in inadequate filling for re-engagement. This is because the typical viscous fluid clutch relies on rotation of the output element, including the reservoir chamber, to provide impetus for moving the fluid to fill the lands and grooves during re-engagement. Accordingly, a required, relatively high minimum disengage speed stands as a barrier to reducing disengage speeds in a conventional viscous fluid clutch. Typically, fluid is constantly being pumped out from between the plates, from the working chamber, through pump holes, and into the reservoir chamber. This continuous fluid expulsion serves as another barrier to reducing disengage speed. If the pumping action were efficient enough to reach a very low disengage speed, it would remove fluid from the working chamber faster than it can be added to engage the clutch.

To set the disengage speed, a minimum fluid quantity that cannot be pumped out is generally maintained in the working chamber. To engage the clutch, additional fluid quantities are introduced to the working chamber by opening a port of the valve that is located radially inside the pump holes. Since centrifugal force tends to prevent the fluid from moving radially inward, other forces must be created to move the fluid to a position from which, it can move through the port and into the working chamber to engage the clutch. To enable the refilling function to engage the clutch forces must be applied to the fluid, in addition to the centrifugal force acting on the fluid as a result of rotation of the clutch. Accordingly, the reservoir chamber typically subjects the fluid to centripetal type forces to move the fluid radially inward against the centrifugal force. With the relative velocity (slip-speed), between the input and output elements determining the pump-out rate, and the rotational speed of the output element (which carries the reservoir chamber), determining the feed-in rate, too slow of a disengage speed can result in fluid being pumped out of the working chamber faster than it can be fed in. In other words, a conventional viscous fluid clutch will not operate if the disengage speed is too slow. With these conditions being present, the challenge exists to provide a viscous fluid clutch that operates with a low disengage speed that is steady state regardless of torque loading variances, and that operates to re-engage under very high disengage slip-speed ratio conditions.

SUMMARY OF THE INVENTION

An objective of the present invention resides in achieving very low disengage speeds, at least partly by placing the pump holes further radially outward than previously thought prudent. Steady operation at these low disengage speeds is maintained with assistance from a rotating peripheral fluid accumulator. Fluid movement is strategically managed through a complex combination of structural factors that achieve desirable operating characteristics. As a result, a viscous fluid fan clutch is achieved that is operable at conventionally inoperable conditions. An aspect in managing low disengage speeds is found in the characteristic of non-newtonian fluids such as those used in the present invention, wherein fluid pressurization causes an increase in viscosity. Taking this increase in viscosity into consideration is critical to maintaining a minimum disengage speed that can react to sudden externally applied torque changes while enabling engagement in low centrifugal force circumstances.

More specifically, a clutch according to aspects of the present invention includes an input element rotating in concert with an engaged input shaft and clutch plate. The clutch plate has an annular portion that includes a set of lands and grooves, an outer surface formed radially outside the set of lands and grooves, and a depleted surface formed adjacent the outer surface. A housing includes a body supported on the input shaft by a bearing, and includes another set of lands and grooves that mate with the clutch plate set of lands and grooves. A shear zone space is defined between the clutch plate set of lands and grooves and the body set of lands and grooves, and the body includes an annular step formed radially outward from the body set of lands and grooves. A cover is included as part of the housing, engaging the body and defining a reservoir.

A pump plate is captured between the cover and the body separating out a working chamber generally within the body. The pump plate includes a valve port and a pump port positioned further radially outward than the valve port, with a wiper positioned adjacent the pump port. The pump port includes an outer extreme edge that is substantially in line with the outer surface of the clutch plate. The valve port is positioned near the radial outside of the reservoir. A control arm normally closes the valve port and is movable to open the valve port. When the valve port is closed, fluid carried in the working chamber moves radially outward under centrifugal force and is forced through the pump port under operation of the wiper due to relative rotation between the clutch plate and the pump plate. During disengagement, substantially all of the fluid is pumped out of the working chamber and a slip speed between the housing and the clutch plate of over approximately 4000 revolutions per minute is achieved. A rotating peripheral accumulator is defined between the depleted surface of the clutch plate and the annular step of the body, that accommodates fluid inertia and provides volumetric compensation for fluid pressurization and compression caused by an externally applied torque change.

Placement of the fluid pump port is critical to certain desirable aspects of the present invention. The port location dictates the amount of fluid left on the rotating shear periphery of the clutch plate, which plays a key role in setting the terminal disengage speed. Additionally, the efficiency of the pump, the ability to maintain fluid control, and the ability to quickly stabilize the fan speed during torque load changes are influenced, at least partially, by pump port location. Fluid flow in the disengage mode is important in maintaining a specific minimum terminal disengage speed.

Advantageously, the pump is not so efficient as to pump too much fluid into the reservoir chamber during periods of fluid inertia amplified flow, which may otherwise cause too low a disengage speed during external torque loading changes. The desired performance characteristic is that the disengaged viscous clutch driven fan operates at a minimum fan speed approximately equal to engine idle speed, in revolutions per minute, when coupled in series with an electric fan that is not running, and operates at a very low to near zero speed when the electric fan is operating. An inner rotating peripheral fluid accumulator formed by the clutch plate accommodates fluid storage needs arising due to fluid compression and pressurization, and minimizes the affect of fluid inertia for stabilized operation as torque loading changes occur, such as those present between operation and inoperation of an in-series electric fan. The accumulator minimizes the impact of fluid inertia type dynamic flow interruptions, which is essential for fluid pressure control between the clutch plate and the body to maintain steady state operation at very low disengage speeds.

Preferably, three equally spaced body expulsion channels, and six clutch plate dispersion channels are provided that are important to low disengage speed function. Such a design provides eighteen passages of radially outward directed fluid flow from the intermeshed lands and grooves per slip revolution for rapid purging. Purging of the lands and grooves rapidly is necessary to maintain a very low to near zero disengage speed. The channel shape and area assures proper fluid flow to the pumps to assist in stabilizing the disengage speed. The fluid expulsion channels, in the body, become fluid dispersion channels as the fan drive is engaged. Positioning of the preferred single engage port as far radially outward as possible, and including the fluid dispersion body channels, provides the capability of filling the lands and grooves at a very low centrifugal force.

The centrifugal force applied by the disengaged output element, which carries the reservoir chamber, is much lower than typical operating fan drives conventionally known in the art, due to the high rotating member differential speed. The fluid engage port is positioned in a manner to take full advantage of centrifugal force that is available to facilitate filling the lands and grooves faster than the fluid can be pumped back into the reservoir via the pump ports. The dispersion channels provide low restriction fluid flow for filling the lands and grooves. This is crucial to proper operation of the clutch during the high disengage slip speed ratio. At disengage slip speed of 4000 revolutions per minute, the clutch plate allows 72,000 fluid dispersions per minute into the body. As a result, the clutch operation tends to fill the lands and grooves from the most inward to the most outward, and is directly opposite to the conventionally typical fill direction. Fluid coupling is primarily controlled by controlling fluid dynamic coupling and fluid shear between the clutch plate and the body.

DESCRIPTION OF THE PREFERRED EMBODIMENT

Figure 1:
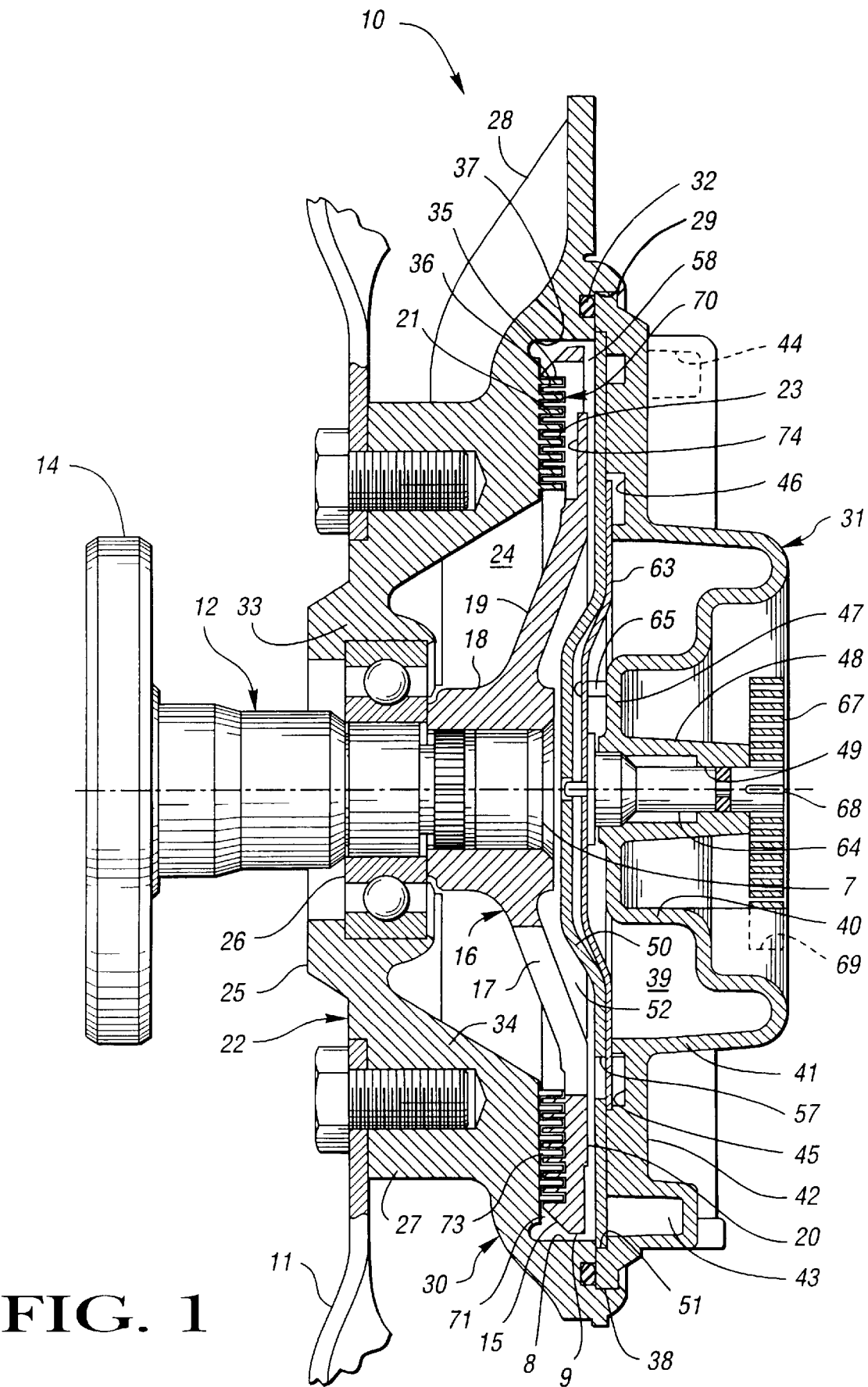
FIG. 1 is a cross sectional illustration of a viscous fluid fan clutch according to aspects of the present invention.

Referring to the drawings, FIG. 1 illustrates a viscous fluid clutch indicated as an assembly at 10. In general, the clutch 10 operates to transfer torque to a fan 11 using the shear characteristics of a contained viscous fluid. The clutch 10 includes a rotary driven input shaft 12 that is mounted to rotate at engine speed or some selected proportion thereof. The input shaft 12 is provided with a central shaft in a tapered configuration with multiple steps that terminate at one end with a flange 14 and another end 7. The flange 14 is adapted to be secured to an engine (not illustrated) in a known manner to drive the clutch 10.

A single clutch plate 16 operates as part of the input element and includes a central hub portion 18 and an annular disk portion 20 that are connected together by a set of integral, generally radially extending spokes 19. Preferably, six spokes are included that define a corresponding set of six openings, representative of which is opening 17, that are evenly distributed in a circular pattern around the clutch plate 16. The clutch plate 16, and specifically the hub portion 18, is engaged with input shaft 12 about end 7 for concerted rotation therewith. Accordingly, when the input shaft 12 is driven by the engine, the clutch plate 16 rotates at the same speed. The spokes 19 support the annular disk portion 20 at a position that is radially spaced outwardly from the axis of the clutch. At this general radially outward position, the annular disk portion 20 presents a series of rearwardly facing axially directed lands 21 formed by a series of annular grooves 23 that are cut in the clutch plate 16. At the rear radially outboard edge of annular disk portion 20, a depletion of the material of the clutch plate 16 forms a surface 15 that is beveled in the present embodiment, but could equally be contoured, stepped or otherwise similarly formed.

Carried about the clutch plate 16 is shell-like housing 22 that defines an internal cavity 24 and includes a hub portion 25 rotatably mounted on the input shaft 12 by a bearing assembly 26. In a conventional manner, the housing 22 is provided with a plurality of fins 28 on its outer surface to dissipate heat transferred from a viscous fluid contained inside the clutch 10. A plurality of bosses 27 are formed on the exterior surface of the housing 22, and the fan 11 is attached by threaded fasteners to the bosses 27. Absent some means of transferring torque from the clutch plate 16 to the housing 22 the housing and the attached fan 11 are carried by the bearing assembly 26 in a generally nonrotating manner.

The housing 22 includes a body 30 and a cover 31 that are formed separately and joined together around an annular step 29, with a seal 32 compressed in the joint to maintain the fluid in the cavity 24. Each of the body 30 and cover 31 are formed by casting a material such as aluminum and machining appropriate features in the casting. The body 30 includes an axially directed wall 33 that is engaged with the outer race of bearing assembly 26. Wall 33 is contiguous with an angled wall 34 that carries the bosses 27, and extends radially outward and forward generally at an angle relative to the axis of the clutch 10. Wall 34 includes a number of lands 35, that are formed by machining a series of annular grooves 36 in the body 30. Lands 35 extend parallel to the axis of the clutch 10 and forwardly into the cavity 24. The lands 35 mesh with the grooves 23 formed in the clutch plate 16, and the grooves 36 mesh with the lands 21 formed in the clutch plate 16 so that the clutch plate 16 and the body 30 mate together with a thin shear zone space maintained between the two components wherein the clutch plate 16 is freely rotatable within the housing 22. A grooved annular step 37 is formed in the body 30 between the outermost land and the annular step 29. The grooved annular step 37 spaces the body 30 away from the depleted surface 15, with the outer surface 9 of the clutch plate 16 positioned close to the body 30 at surface 8.

Cover 31 has an annular outer edge 38 secured to the body 30 by an annular retainer lip spun over from the material at the outer periphery of the body 30. Within what has been generally defined as the cavity 24 formed by the housing 22, a fluid reservoir 39 is formed as an annular chamber in the interior surface of the cover 31 generally between axially extending annular walls 40 and 41. A radially directed annular wall 42 extends from the wall 41 to the outer edge 38. The annular wall 42 includes a pair of internal chambers 43 and 44, that absent some means of closure, are open to the cavity 24. The chambers 43 and 44 are open to the reservoir 39 through a pair of generally spiraling channels 45 and 46, respectively, as is generally known in the art. The wall 40 extends to an annular wall 47 that supports a generally cylindrical wall 48 defining an axial opening 49 to the cavity 24.

Figure 2:
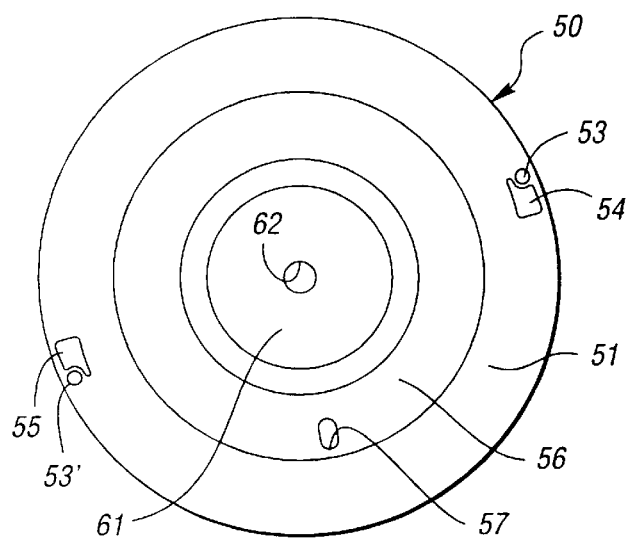
FIG. 2 is a detail illustration of a pump plate utilized in the viscous fluid fan clutch of FIG. 1.

A disk-like pump plate 50 is positioned between the body 30 and the cover 31 on an annular step 51 of the cover 31 and is fixed with the housing 22. The pump plate 50 separates out a working chamber 52 within the cavity 24 and generally within the body 30. The fluid reservoir 39, chambers 43, 44 and channels 45, 46 are substantially separated from the working chamber 52 by the pump plate 50. Referring to FIG. 2, the pump plate 50 is illustrated in greater detail, and is viewed from the side of working chamber 52 which is the left side of pump plate 50 in FIG. 1. Pump plate 50 includes a flat outer annular shaped segment 51 that includes a pair of diametrically opposed pump ports 53 and 53'. A pair of wipers 54 and 55 are positioned adjacent the pump ports 53 and 53' respectively, and are fixed to the pump plate 50 on what is the rotationally earlier side. In other words, when the pump plate rotates, the wipers pass a given point in space prior to the time the adjacent pump port passes that point. With additional reference to FIG. 3, the wipers are positioned in an annular void 58 that exists between recessed surface 59 of the clutch plate 16 and the pump plate 50. The outer extreme edge 60 of the pump port 53 is aligned with the outer surface 9 of the clutch plate 16, as is the outer extreme edge of the pump port 53'. Pump plate 50 includes a segment 56, radially inside segment 51 that includes a single valve port 57 that extends completely through the pump plate 50. The valve port 57 comprises an elongated opening that is obliquely positioned. As seen in FIG. 1, the valve port 57 is positioned radially outboard from the reservoir wall 41. Pump plate 50 also includes a raised segment 61 that extends toward the clutch plate 16 and includes a clearance opening 62.

A rotatable control arm indicated generally at 63 in FIG. 1, is positioned adjacent the pump plate 50 and near the clearance opening 62 which receives a spun or peened over stud that retains the control arm 63 on shaft 64. The clearance opening 62 remains open to allow air flow through the pump plate 50. Preferably, the control arm 63 is a formed strip of spring steel. In the embodiment illustrated, the control arm 63 is a flexible, longitudinal member having a central portion with opposite extensions connected to the central portion by intermediate ramp portions to form a profile complementary to the pump plate 50. When assembled in the clutch 10, the control arm 63 contacts the front surface of segment 56 of pump plate 50, normally closing the pump port 57.

The shaft 64 is rotatably and sealing positioned in axial opening 49 of cover 31. Rotational movement of the control arm 63 and shaft 64 is limited by one or more stops 65 formed in the inner surface of the cover 31. A bimetallic spiral coil 67 is mounted with one end 68 in a slot in the forward end of the shaft 64 and another end 69 grounded in the cover 31. Preferably, the bimetallic coil 67 is recessed within a cavity bounded by the annular raised portion of the cover 31. The bimetallic coil 67 responds to the ambient air temperature surrounding the cover 31. An increase in air temperature causes the coil 67 to expand, thereby rotating the shaft 64 and the control arm 63 to uncover the valve port 57 in the pump plate 50 when the temperature is above a certain predetermined level calling for additional air flow to increase the cooling rate. When the air temperature has decreased, the bimetallic coil 67 contracts, causing the shaft 64 and control arm 63 to rotate back to their original positions, thereby covering the valve port 57 in the pump plate 50.

With the clutch 10 as thus far described, the clutch plate 16 will rotate with the input shaft 12, while the housing 22, pump plate 50 and fan 11 are substantially disengaged from such rotation through the bearing assembly 33. To provide a mechanism for engaging the housing 22 to rotate with the clutch plate 16 a fluid (not illustrated), such as silicone with a viscosity in the neighborhood of 9000 centistokes, is carried in the cavity 24. Preferably, the fluid is of a type that is known in the art and is specifically developed for use in fan clutches. A fluid shear zone 70 is formed in the space between the clutch plate 16 and the housing 22 including the shear zone space between the lands 21 and grooves 23 of the clutch plate 16, and the lands 35 and grooves 36 of the body 30. Fluid sheared in the shear zone 70 transmits input torque from the rotatably driven clutch plate 16 to provide hydraulic drive of the housing 22 and the attached fan 11.

With the control arm 63 covering the valve port 57, very little fluid is maintained in the working chamber 52. The amount of slip between the clutch plate 16 and the housing 22 is determined by the amount of fluid in the working chamber 52. Accordingly, when the valve port 57 is closed, a large slip speed ratio exists wherein the clutch plate 16 rotates at the driven speed of the input shaft 12 and the housing 22 rotates at some slower speed. The relative rotation causes the fluid to be directed radially outward under centrifugal force in both the working chamber 52 and in the cover 31. Absent other forces, the centrifugal force would cause a relatively level distribution of the fluid about the radially outward area of cavity 24 on both sides of the pump plate 50. The application of "other" forces is important to the functionality of the clutch 10.

Figure 3:
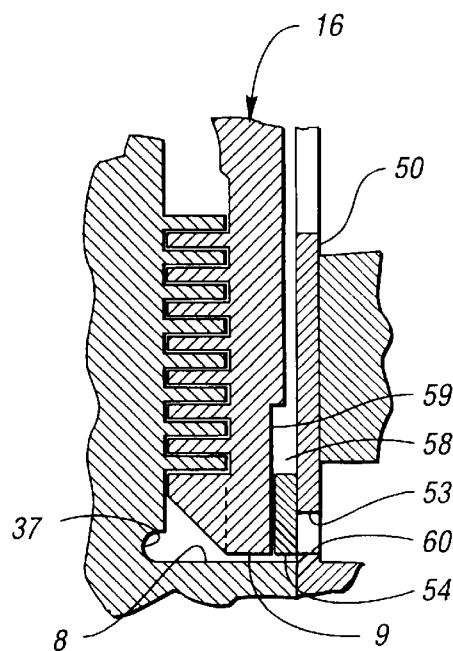
FIG. 3 is a detail fragmentary cross sectional illustration of the pump port area of the viscous fluid fan clutch of FIG. 1.

The relative speed between the clutch plate 16 and the pump plate 50 (which is attached to the housing 22), effects pumping action by creating a head of pressure in the annular void 58 on the working chamber side of the pump plate and in particular, at the wipers 54, 55 about the inlets to the pump ports 53 and 53'. Hydraulic pressure causes fluid flow through the pump ports 53 and 53' which are always open. With the valve port 57 closed, fluid is expelled from the working chamber 52 to a level that is at the radial outside of the pump ports 53, 53', which is at the outer extreme edge 60 as shown in FIG. 3. At this fluid level in the working chamber 52, only the space between the adjacent surface 8 of the body 30 and the outer surface 9 of the clutch plate 16 and the adjacent area at grooved annular step 37, contain fluid. The amount of force transferred through shearing this amount of fluid effects a very slow disengage speed for the housing 22. For example, the terminal disengage speed is targeted to not exceed 1000 revolutions per minute regardless of engine speed. When external torque inputs are received, such as by intermittent operation of an electric fan (not illustrated), in series with the fan 11, the disengage speed typically drops below 300 revolutions per minute and can drop to near zero over the vehicle driving range. Driving the fan at this low of a disengage speed is particular advantageous from an efficiency standpoint.

A rotating peripheral fluid accumulator 71 is annular in shape and is formed between the grooved annular step 37 of body 30 and the depleted surface 15 of clutch plate 16. The accumulator 71 accommodates fluid inertia and provides volumetric compensation for fluid pressurization and compression caused by changes in externally applied torque loads on the fan 11. This is important to maintaining a steady-state disengage speed under such variable conditions.

To engage the clutch 10, fluid must be introduced into the working chamber at a rate faster than it is removed by the pump plate 50. Fluid flow to the shear zone 70 is controlled by the control arm 63. When the control arm 63 is rotated by a thermally induced response of the coil 67, the valve port 57 is opened. Fluid on the reservoir 39 side of pump plate 50 will move through the valve port 57 to the working chamber 52 under centrifugal force if the fluid is carried radially inward from the valve port 57. Accordingly, the reservoir 39 is provided to carry fluid and, since the cover 31 including the reservoir 39, is rotating rather slowly during disengagement, the valve port 57 is located in a radially outward location. This takes full advantage of the centrifugal force induced hydraulic pressure that is available, allowing the shear zone 70 to fill faster than the fluid is removed from the working chamber 52. This is particularly important due to the very high slip speed ratio that exists during disengagement, producing an efficient pumping effect. To assist proper engagement, the overall size of the valve port 57 is about 6.26 mm long by 3.26 mm wide. In comparison, the diameter of the pump port is about 1.60 mm.

Since the fluid tends to be forced radially outwardly in both the working chamber 52 and in the cover 31, a mechanism must move the fluid from the chambers 43, 44 to the reservoir 39. The hydraulic pressure effected by the wipers 54, 55 provides such a mechanism by forcing the fluid through the pump ports 53, 53' and through the chambers 43, 44, and the channels 45, 46 to the reservoir 39. The spiral shape of the channels 45, 46 assists in moving the fluid inwardly by effecting a centripetal-like force through rotation of the cover 31. With the fluid contained in the reservoir 39, it readily moves into the working chamber 52 when the valve port 57 is open. At the initial opening of the valve port 57 a instantaneous pressure spurt may occur. Centrifugal forces of the rotating clutch 10 move the fluid into a radially directed flow between the pump plate and the clutch plate 16. The fluid tends to be directed to the path of least resistance which is through the openings 17 between the spokes 19 and into the shear zone 70, since an annular high pressure zone exists in the annular void 58 under action of the wipers 54, 55. Centrifugal forces cause the fluid to be dispersed radially outwardly throughout the shear zone 70. Due to the high slip speed ratio, the fluid tends to fill the shear zone space between the lands and grooves of the clutch plate 16 and the body 30 from the radially inner-most to the radially outermost. This is advantageous in filling the shear zone 70 to engage the clutch 10 since fluid is removed to the reservoir near the outer perimeter of the clutch plate 16. Fluid friction in the shear zone 70 transmits the rotation of the clutch plate 16 to the housing 22. As the housing 22 rotates, the attached fan 11 is rotated to draw cooling air through a radiator (not illustrated) and assist in cooling an internal combustion engine in a wellknown manner.

Figure 4:
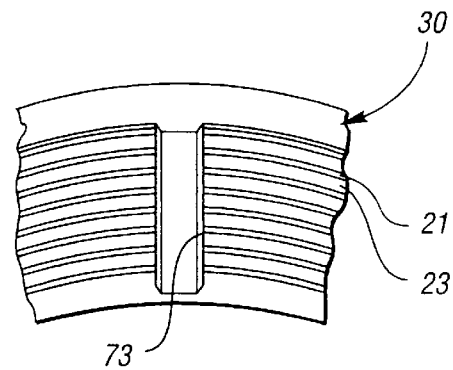
FIG. 4 is a detail illustration of an expulsion channel area of the viscous fluid clutch of FIG. 1.

The present embodiment includes features for assisting in the distribution of the fluid throughout the shear zone 70 and in particular, the shear zone space. Three equally spaced body expulsion channels are distributed around the body 30 and are represented by the body expulsion channel 73 shown in FIG. 1. The body expulsion channel is more clearly illustrated in FIG. 4, which shows a view of the body 30 from inside the cavity 24. The expulsion channel slices completely through the lands 21 and across the grooves 23. These expulsion channels are important in moving fluid radially outward for proper purging during disengagement, especially in light of the relatively low centrifugal force during disengagement. During engagement, the expulsion channels become dispersion channels and are also important in filling the shear zone 70 at low centrifugal force.

Figure 5:
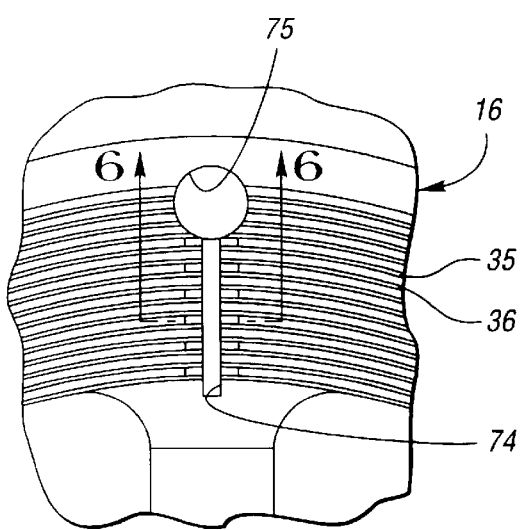
FIG. 5 is a detail illustration of a dispersion channel area of the viscous fluid clutch of FIG. 1.
Figure 6:
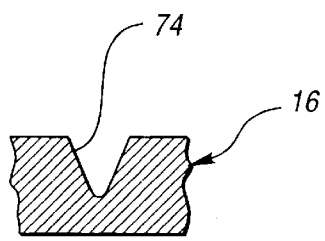
FIG. 6 is a cross sectional illustration taken generally through the plane indicated by the line 6—6 in FIG. 5.

The expulsion channel 73 act in concert with six equally spaced radially directed dispersion channels formed in the clutch plate 16. The dispersion channels are represented by dispersion channel 74, shown in FIG. 1. The dispersion channel 74 is more clearly shown in FIG. 5. The dispersion channel 74 slices completely through the lands 35 and across the grooves, but does not extend completely longitudinally through the clutch plate 16 as seen in FIG. 6, which illustrates the V-shaped cross section of the dispersion channels. Two of the six dispersion channels, positioned on opposed sides of the clutch plate 16 are intersected by axially directed holes as represented by hole 75, shown in FIG. 5. The hole 75 extends completely through the clutch plate 16 which allows some fluid to bleed to the periphery of the clutch plate 16, inhibiting pump cavitation and undesirable fluid aeration. The registry between expulsion channels 73 and dispersion channels 74 provides eighteen passages of fluid flow per slip revolution. In the present embodiment, disengage slip speeds reach over 4000 revolutions per minute due to the nearly complete expulsion of fluid from the working chamber 52. This provides 72,000 dispersions of fluid per minute in the shear zone 70 which provides desirable filling under relatively low centrifugal force.

Accordingly, the present embodiment advantageously provides a clutch 10 with very low disengage speeds, at least partly by placing the pump ports 53, 53' further radially outward than previously thought prudent. Steady operation at these low disengage speeds is desirably maintained with assistance from a rotating peripheral fluid accumulator 71. Fluid movement is strategically managed through a complex combination of beneficial structural factors that achieve desirable operating characteristics. When the clutch 10 is disengaged, substantially all of the fluid is pumped out of the working chamber 52 and a high slip speed is established between the housing 22 and the clutch plate 16 resulting in efficient pumping operation without unduly inhibiting engagement operation. A rotating peripheral accumulator 71 is defined between a depleted surface 15 of the clutch plate 16 and the grooved annular step 37 of the body 30 that accommodates fluid inertia and provides volumetric compensation for fluid pressurization and compression caused by an externally applied torque change. The volumetric size of the accumulator 71 is about the same volumetric size as the clearance space between the surfaces 8 and 9.

I claim:

1. A clutch comprising:

an input element including an input shaft with a clutch plate engaged with the input shaft to rotate in concert therewith, the clutch plate having an annular disk portion with a clutch plate set of lands and grooves, with an outer surface formed radially outside the clutch plate set of lands and grooves and a depleted surface formed adjacent the outer surface;

a housing including a body supported on the input shaft by a bearing with a body set of lands and grooves mating with the clutch plate set of lands and grooves, with a shear zone space defined between the clutch plate set of lands and grooves and the body set of lands and grooves, wherein the body includes an annular step formed radially outwardly from the body set of lands and grooves, and wherein a cover is included as part of the housing and is engaged with the body and includes a reservoir;

a pump plate captured between the cover and the body separating out a working chamber, the pump plate including a valve port and a pump port positioned further radially outward in the pump plate than the valve port, with a wiper positioned adjacent the pump port, wherein the pump port includes an outer extreme edge that is substantially in line with the outer surface of the clutch plate and wherein the valve port is positioned near a radial outside of the reservoir; and a control arm normally closing the valve port and being movable to open the valve port, wherein when the valve port is closed a fluid carried in the working chamber moves radially outward under centrifugal force and is forced through the pump port under operation of the wiper due to relative rotation between the clutch plate and the pump plate so that substantially all of the fluid is pumped out of the working chamber and a slip speed between the housing and the clutch plate of approximately 4000 revolutions per minute is achieved, wherein a rotating peripheral accumulator is defined between the depleted surface of the clutch plate and the annular step of the body that accommodates fluid inertia and provides volumetric compensation for fluid pressurization and compression caused by an externally applied torque change.

2. A clutch according to claim 1 wherein an annular space is defined between the outer surface of the clutch plate and an adjacent surface of the body and wherein volumetric size of the rotating peripheral accumulator is larger than volumetric size of the annular space.

3. A clutch comprising:

an input element including an input shaft with a clutch plate engaged with the input shaft to rotate in concert therewith, the clutch plate having an annular disk portion supported by a series of spokes with openings between the spokes, wherein the clutch plate includes a clutch plate set of lands and grooves, with an outer surface formed radially outside the clutch plate set of lands and grooves and a depleted surface formed adjacent the outer surface;

a housing including a body supported on the input shaft by a bearing with a body set of lands and grooves mating with the clutch plate set of lands and grooves, with a shear zone space defined between the clutch plate set of lands and grooves and the body set of lands and grooves, wherein the body includes an annular step formed radially outwardly from the body set of lands and grooves;

a cover included as part of the housing and engaged with the body, the cover including a reservoir and a channel extending generally radially outward from the reservoir to a chamber in the cover;

a pump plate captured between the cover and the body separating out a working chamber generally within the body, the pump plate including a valve port and a pump port positioned further radially outward in the pump plate than the valve port, with a wiper positioned adjacent the pump port, wherein the pump port includes an outer extreme edge that is in line with the outer surface of the clutch plate and wherein the valve port is positioned near a radial outside of the reservoir; and a control arm normally closing the valve port and being movable to open the valve port, wherein when the valve port is closed a fluid carried in the working chamber moves radially outward under centrifugal force and is forced through the pump port under operation of the wiper due to relative rotation between the clutch plate and the pump plate, wherein the wiper develops a high pressure zone on the working chamber side of the pump port so that substantially all of the fluid is pumped out of the working chamber through the pump port and into the chamber in the cover and is forced through the chamber and the channel to the reservoir, wherein a slip speed between the housing and the clutch plate of approximately over 4000 revolutions per minute is achieved, wherein a rotating peripheral accumulator is defined between the depleted surface of the clutch plate and the annular step of the body that accommodates fluid inertia and provides volumetric compensation for fluid pressurization and compression caused by an externally applied torque change, wherein when the valve port is opened, fluid moves from the reservoir into the working chamber through the valve port under centrifugal force, and in the working chamber fluid moves through the openings between the spokes of the clutch plate and into the shear zone space to transfer increased levels of torque from the input element to the housing.

4. A clutch according to claim 3 wherein an annular space is defined between the outer surface of the clutch plate and an adjacent surface of the body and wherein volumetric size of the rotating peripheral accumulator is larger than volumetric size of the annular space.

5. A clutch comprising:

an input element including an input shaft with a clutch plate engaged with the input shaft to rotate in concert therewith, the clutch plate having an annular disk portion supported by a series of spokes with openings between the spokes, wherein the clutch plate includes a clutch plate set of lands and grooves, with an outer surface formed radially outside the clutch plate set of lands and grooves and a depleted surface formed adjacent the outer surface, wherein the clutch plate includes a radially extending dispersion channel slicing completely through the clutch plate set of lands and grooves;

a housing including a body supported on the input shaft by a bearing with a body set of lands and grooves mating with the clutch plate set of lands and grooves, with a shear zone space defined between the clutch plate set of lands and grooves and the body set of lands and grooves, wherein the body includes an annular step formed radially outwardly from the body set of lands and grooves, wherein the body includes a radially directed expulsion channel slicing completely through the body set of lands and grooves;

a cover included as part of the housing and engaged with the body, the cover including a reservoir and a channel extending generally radially outward from the reservoir to a chamber in the cover;

a pump plate captured between the cover and the body separating out a working chamber generally within the body, the pump plate including a valve port and a pump port positioned further radially outward in the pump plate than the valve port, with a wiper positioned adjacent the pump port, wherein the pump port includes an outer extreme edge that is in line with the outer surface of the clutch plate and wherein the valve port is positioned near a radial outside of the reservoir; and a control arm normally closing the valve port and being movable to open the valve port, wherein when the valve port is closed a fluid carried in the working chamber moves radially outward under centrifugal force and is forced through the pump port under operation of the wiper due to relative rotation between the clutch plate and the pump plate, wherein the wiper develops a high pressure zone on the working chamber side of the pump port so that substantially all of the fluid is pumped out of the working chamber through the pump port and into the chamber in the cover and is forced through the channel to the reservoir, wherein a slip speed between the housing and the clutch plate of approximately over 4000 revolutions per minute is achieved, wherein a rotating peripheral accumulator is defined between the depleted surface of the clutch plate and the annular step of the body that accommodates fluid inertia and provides volumetric compensation for fluid pressurization and compression caused by an externally applied torque change, wherein when the valve port is opened, fluid moves from the reservoir into the working chamber through the valve port under centrifugal force, and in the working chamber fluid moves through the openings between the spokes of the clutch plate and into the shear zone space to transfer increased levels of torque from the input element to the housing wherein fluid is facilitated in moving through the shear zone space by fluid dispersion effected through registry between the dispersion channel in the clutch plate and the expulsion channel in the body.

6. A clutch according to claim 5 wherein an annular space is defined between the outer surface of the clutch plate and an adjacent surface of the body and wherein volumetric size of the rotating peripheral accumulator is larger than volumetric size of the annular space.

7. A clutch for driving a fan at low disengage speeds and at relatively higher engage speeds wherein the fan is subjected to variable torque loads comprising:

an input element including an input shaft with a clutch plate engaged with the input shaft to rotate in concert therewith, the clutch plate having an annular disk portion supported by a series of spokes with openings between the spokes, wherein the clutch plate includes a clutch plate set of lands and grooves, with a radially outward facing outer surface formed radially outside the clutch plate set of lands and grooves and a depleted surface formed adjacent the outer surface, wherein the clutch plate includes a radially extending dispersion channel slicing completely through the clutch plate set of lands and grooves and having a V-shaped cross section;

a housing including a body supported on the input shaft by a bearing with a body set of lands and grooves mating with the clutch plate set of lands and grooves, with a shear zone space defined between the clutch plate set of lands and grooves and the body set of lands and grooves, wherein the body includes a grooved annular step formed radially outwardly from the body set of lands and grooves and a radially inward facing surface adjacent the grooved annular step, wherein the body includes a radially directed expulsion channel slicing completely through the body set of lands and grooves;

a cover included as part of the housing and engaged with the body, the cover including a reservoir and a channel extending generally radially outward from the reservoir to a chamber in the cover;

a pump plate captured between the cover and the body separating out a working chamber generally within the body, the pump plate including a valve port and a pump port positioned further radially outward in the pump plate than the valve port, with a wiper positioned adjacent the pump port, wherein the pump port includes an outer extreme edge that is in line with the outer surface of the clutch plate and wherein the valve port is positioned generally radially outside of the reservoir; and a control arm normally closing the valve port and being movable to open the valve port, wherein when the valve port is closed a fluid carried in the working chamber moves radially outward under centrifugal force and is forced through the pump port under operation of the wiper due to relative rotation between the clutch plate and the pump plate, wherein the wiper develops a high pressure zone on the working chamber side of the pump port so that substantially all of the fluid is pumped out of the working chamber through the pump port and into the chamber in the cover and is forced through the channel to the reservoir, wherein a slip speed between the housing and the clutch plate of approximately over 4000 revolutions per minute is achieved, wherein a rotating peripheral accumulator is defined between the depleted surface of the clutch plate and the grooved annular step of the body that accommodates fluid inertia and provides volumetric compensation for fluid pressurization and compression caused by the variable torque loads, wherein an annular space is defined between the outer surface of the clutch plate and the radially inward facing surface of the body and wherein volumetric size of the rotating peripheral accumulator is large relative to volumetric size of the annular space, wherein when the valve port is opened, fluid moves from the reservoir into the working chamber through the valve port under centrifugal force, and in the working chamber fluid moves through the openings between the spokes of the clutch plate and into the shear zone space to transfer increased levels of torque from the input element to the housing wherein fluid is facilitated in moving through the shear zone space by fluid dispersion effected through registry between the dispersion channel in the clutch plate and the expulsion channel in the body.

8. A clutch according to claim 7 wherein the clutch plate includes six dispersion channels and the body includes three expulsion channels so that registry between the dispersion channels and the expulsion channels results in as many as 72,000 fluid dispersions per minute.

* * * * *